US012566632B2

(12) United States Patent
Sekino

(10) Patent No.: US 12,566,632 B2
(45) Date of Patent: Mar. 3, 2026

(54) ELECTRIC DEVICE THAT EXECUTES OR DOES NOT EXECUTE PROCESSING ITEMS BASED ON AN EXECUTION TIME, AND CONTROLLING METHOD FOR ELECTRIC DEVICE

(71) Applicant: HONDA MOTOR CO., LTD., Tokyo (JP)

(72) Inventor: Akihiro Sekino, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 439 days.

(21) Appl. No.: 18/185,494

(22) Filed: Mar. 17, 2023

(65) Prior Publication Data

US 2023/0315520 A1     Oct. 5, 2023

(30) Foreign Application Priority Data

Mar. 31, 2022     (JP) ................................. 2022-058135

(51) Int. Cl.
    *G06F 9/48*          (2006.01)
    *G06F 9/50*          (2006.01)
(52) U.S. Cl.
    CPC ............ *G06F 9/4881* (2013.01); *G06F 9/505* (2013.01)
(58) Field of Classification Search
    None
    See application file for complete search history.

(56) References Cited

U.S. PATENT DOCUMENTS

| | | | | |
|---|---|---|---|---|
| 7,890,227 B2 * | 2/2011 | Sayama | ................. | H02J 9/061 |
| | | | | 701/1 |
| 8,135,533 B2 * | 3/2012 | Noda | ................. | G06F 11/1433 |
| | | | | 717/168 |
| 8,140,746 B2 * | 3/2012 | Trichina | .............. | G06F 12/0246 |
| | | | | 711/112 |
| 12,115,932 B2 * | 10/2024 | Goto | ..................... | B60R 25/209 |
| 2008/0088482 A1 * | 4/2008 | Okada | ...................... | G03B 7/26 |
| | | | | 340/937 |
| 2019/0258469 A1 | 8/2019 | Hayashidera | | |
| 2021/0385095 A1 * | 12/2021 | Raaijmakers | ........... | B60L 53/66 |

FOREIGN PATENT DOCUMENTS

JP          2019-144669 A        8/2019

* cited by examiner

*Primary Examiner* — Van H Nguyen
(74) *Attorney, Agent, or Firm* — Rankin, Hill & Clark LLP

(57) ABSTRACT

There is provided an electric device, comprising: a first memory that stores first data participating with control of the vehicle; a second memory that stores second data not participating with control of the vehicle; a reading controlling section that reads the second data subsequently to reading the first data; a management processing executing section that, when the reading controlling section reads the second data, executes management processing for managing the second memory; and an execution time detecting section that detects an execution time of the management processing, wherein the management processing executing section does not execute, out of a plurality of processing items included in the management processing, one or parts of the processing items, based on the execution time detected by the execution time detecting section.

6 Claims, 5 Drawing Sheets

ELECTRIC DEVICE THAT EXECUTES OR DOES NOT EXECUTE PROCESSING ITEMS BASED ON AN EXECUTION TIME, AND CONTROLLING METHOD FOR ELECTRIC DEVICE

INCORPORATION BY REFERENCE

The present application claims priority under 35 U.S.C. § 119 to Japanese Patent Application No. 2022-058135 filed on Mar. 31, 2022. The content of the application is incorporated herein by reference in its entirety.

BACKGROUND OF THE INVENTION

Field of the Invention

The present invention relates to an electric device and a controlling method for an electric device.

Description of the Related Art

There are recently being conducted research and development for further improving safety in traffic to contribute to development of sustainable transportation systems. Further, there is conventionally known, as a technology for further improving safety in traffic, a technology regarding data stored by an electric device included in a vehicle (for example, see Japanese Patent Laid-Open No. 2019-144669, which is hereinafter referred to as Patent Literature 1). Patent Literature 1 discloses that an ECU (Electronic Control Unit) has a storage section storing programs as data and that the storage section includes: a vehicle control program storage area for storing a control program; and a second program storage area for storing an update program as an update version of the control program.

SUMMARY OF THE INVENTION

Now, there is a case where, with an electric device such as the ECU disclosed in Patent Literature 1, management processing for managing memories is executed when data is read from a memory, depending on the type of the memory storing the data. In this case, there is a concern that the electric device cannot quickly complete the reading the data from the memory due to the executing the management processing.

An object of the present invention, which has been made in view of the aforementioned circumstances, is to provide an electric device and a controlling method for an electric device capable of quickly completing reading data from a memory.

There is provided an electric device according to an aspect of the present invention that is to be included in a vehicle, the device including: a first memory that stores first data participating with control of the vehicle; a second memory that stores second data not participating with control of the vehicle; a reading controlling section that, when a power supply for the vehicle is turned on, reads the first data, and after reading the first data, reads the second data subsequently to the reading the first data; a management processing executing section that, when the reading controlling section reads the second data, executes management processing for managing the second memory; and an execution time detecting section that detects an execution time of the management processing executed by the management processing executing section, wherein the management processing executing section does not execute, out of a plurality of processing items included in the management processing, one or parts of the processing items, based on the execution time detected by the execution time detecting section.

According to an aspect of the present invention, reading data from a memory can be quickly completed.

DETAILED DESCRIPTION OF THE PREFERRED EMBODIMENTS

Figure 1:
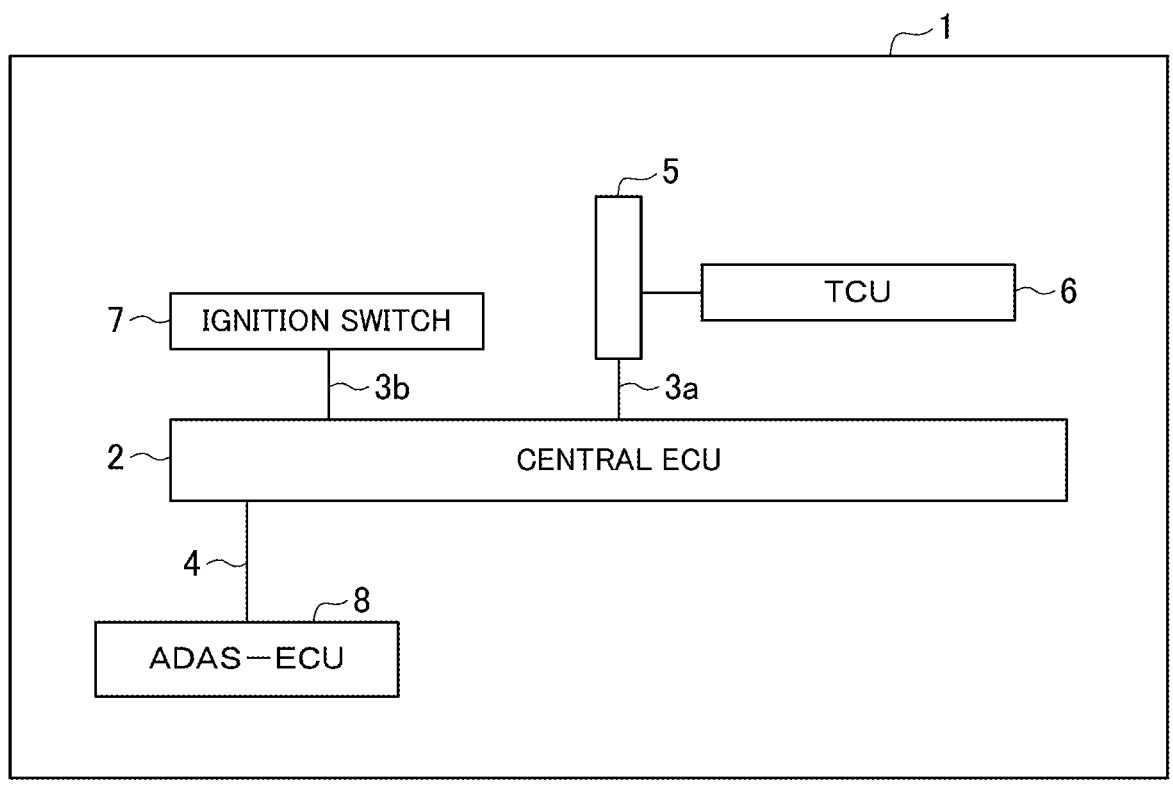
FIG. 1 is a diagram showing a configuration of a controlling system.

FIG. 1 is a diagram showing a controlling system 1 for a vehicle.

The controlling system 1 includes a central ECU 2 which performs general control and information processing for a vehicle. The central ECU 2 is connected to a communication line including first communication lines 3a and 3b and a second communication line 4. The central ECU 2 implements a function of a gateway which manages transmission and reception of communication data between these communication lines. Moreover, the central ECU 2 performs OTA (Over The Air) management. The OTA management includes control regarding processing of downloading update programs for in-vehicle devices included in the vehicle from a server outside the vehicle and processing of applying the downloaded update programs to the in-vehicle devices.

The first communication lines 3a and 3b and the second communication line 4 are constituted of buses which perform communication in conformity to the standards such as the CAN and the Ethernet (registered trademark) or communication lines that perform P2P (Peer to Peer) communication. Notably, the first communication line 3a may be constituted of a plurality of communication lines that perform communication in conformity to an identical standard or may be constituted of a plurality of communication lines that perform communication in conformity to different standards. The same holds true for the second communication line 4.

A TCU (Telematics Control Unit) 6 is connected to the first communication line 3a via an in-vehicle connection link 5. The TCU 6 is a wireless communication device (transmitter/receiver, circuit) in conformity to the communication standards for mobile communication systems.

The in-vehicle connection link 5 is constituted of a plurality of communication transmission paths in conformity to various communication standards. For example, the in-vehicle connection link 5 may include a plurality of network transmission paths. In this case, the plurality of network transmission paths may be connected to one another via a device having a gateway function, and the like. Moreover, the in-vehicle connection link 5 may include a transmission path for performing the P2P communication. For the network transmission paths, there can be employed various communication buses that perform network communication in conformity to various standards. Examples of these types of standards include the CAN, the Ethernet, the USB (Universal Serial Bus), the LIN (Local Interconnect Network), and the LVDS (Low Voltage Differential Signaling), and can also include other standards.

An ignition switch 7 is connected to the first communication line 3*b*. The ignition switch 7 is a switch that accepts a startup manipulation and a stopping manipulation for a vehicle V and turns on and off an ignition power supply for the vehicle V.

The ignition power supply corresponds to a "power supply" of the present disclosure.

An ADAS-ECU (ADAS: Advanced Driver-Assistance System) 8 is connected to the second communication line 4.

Hereafter, the sign "V" is given a vehicle having the controlling system 1.

Figure 2:
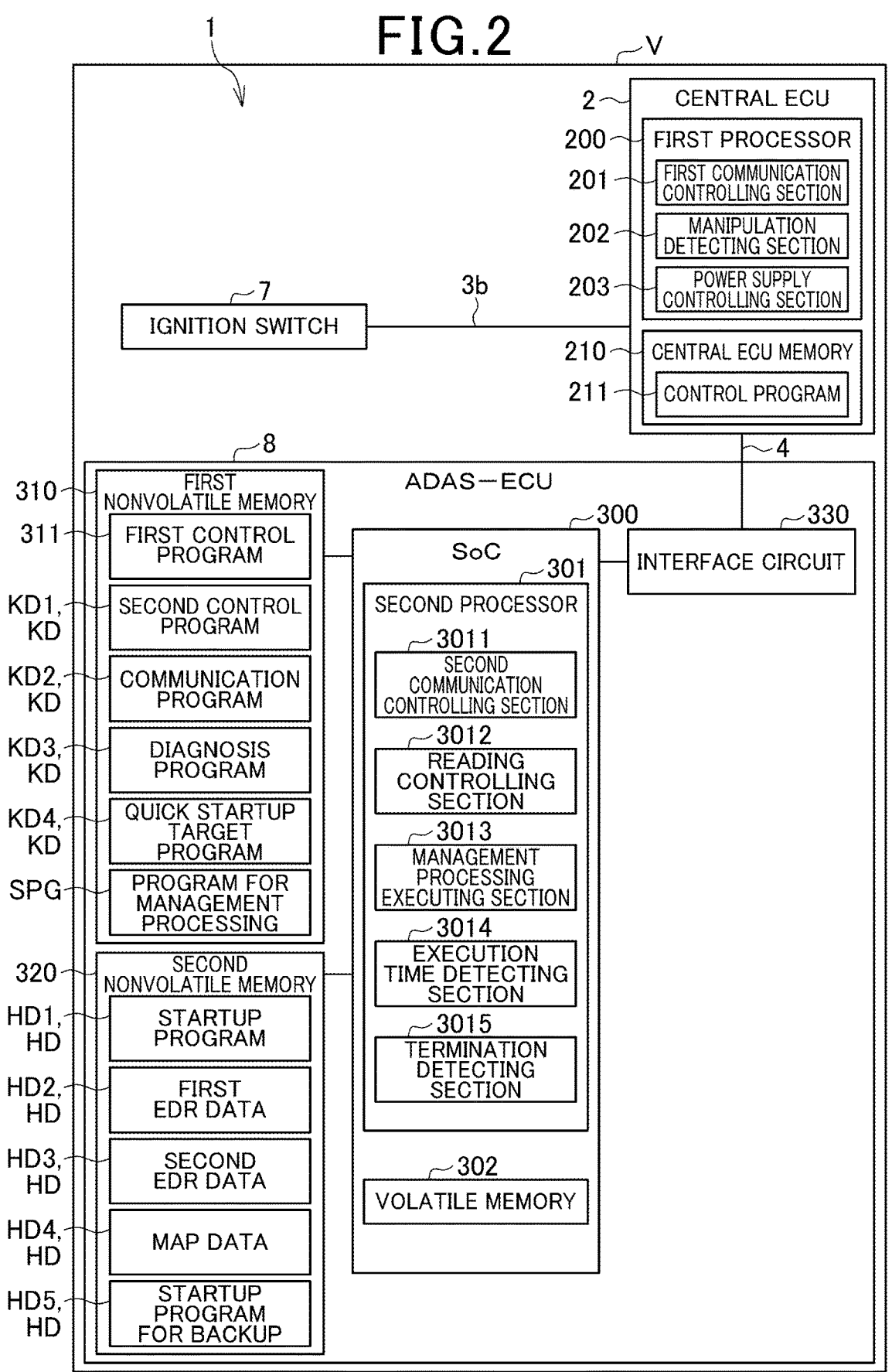
FIG. 2 is a block diagram showing a configuration of the essential part of the controlling system.

FIG. 2 is a block diagram showing a configuration of the essential part of the controlling system 1 included in the vehicle V.

The central ECU 2 includes a first processor 200 such as a CPU (Central Processing Unit) or an MPU (Micro Processor Unit), a central ECU memory 210, and an interface circuit that equipment such as devices and sensors is connected to.

The central ECU memory 210 is a storage device storing programs executed by the first processor 200 and data in a nonvolatile manner. The central ECU memory 210 is constituted of a magnetic storage device, a semiconductor storage element such as a flash ROM (Read Only Memory) or another kind of nonvolatile storage device. Moreover, the central ECU memory 210 may include a RAM (Random Access Memory) constituting a work area for the first processor 200. Moreover, the central ECU memory 210 may include a nonvolatile storage device such as an HDD (Hard Disk Drive) or an SSD (Solid State Drive). The central ECU memory 210 stores data processed by the first processor 200 and a control program 211 executed by the first processor 200.

The first processor 200 functions as a first communication controlling section 201, a manipulation detecting section 202, and a power supply controlling section 203 by reading and executing the control program 211 stored in the central ECU memory 210.

The first communication controlling section 201 communicates with ECUs connected to the central ECU 2 and devices connected to the central ECU 2 via an interface circuit of the central ECU 2.

The manipulation detecting section 202 detects a user manipulation of turning on/off the ignition power supply of the vehicle V, based on a signal output by the ignition switch 7. The manipulation detecting section 202 outputs the detection result to the power supply controlling section 203.

The power supply controlling section 203 controls turning on/off the ignition power supply, based on the detection result of the manipulation detecting section 202. When the detection result of the manipulation detecting section 202 indicates that the ignition power supply is to be turned on, the power supply controlling section 203 turns on the ignition power supply. On the other hand, when the detection result of the manipulation detecting section 202 indicates that the ignition power supply is to be turned off, the power supply controlling section 203 turns off the ignition power supply.

The ADAS-ECU 8 is connected to the central ECU 2.

The ADAS-ECU 8 includes an SoC (System-on-a-chip) 300, a first nonvolatile memory 310, a second nonvolatile memory 320, and an interface circuit 330.

The ADAS-ECU 8 corresponds to an "electric device" of the present disclosure. The first nonvolatile memory 310 corresponds to a "first memory" of the present disclosure. The second nonvolatile memory 320 corresponds to a "second memory" of the present disclosure.

The SoC 300 includes a second processor 301 such as a CPU (Central Processing Unit) or an MPU (Micro Processor Unit), a volatile memory 302 constituted of a RAM, and an interface circuit which devices are connected to.

To the SoC 300, the first nonvolatile memory 310, the second nonvolatile memory 320, and the interface circuit 330 are connected.

The first nonvolatile memory 310 is a memory constituted of NOR flash memory elements. Namely, the first nonvolatile memory 310 is a NOR flash memory. The first nonvolatile memory 310 stores a first control program 311, participating data KD, and a program SPG for management processing.

The participating data KD corresponds to "first data" of the present disclosure.

The participating data KD is data participating with control of the vehicle V. In the present embodiment, programs participating with control of the vehicle V (each hereinafter called "participating program") are exemplified as the participating data KD. In FIG. 2, a second control program KD1, a communication program KD2, a diagnosis program KD3, and a quick startup target program KD4 are exemplified as the participating programs.

The second control program KD1 is a program regarding travelling of the vehicle V.

The communication program KD2 is a program for communication according to the communication standards via the second communication line 4.

The diagnosis program KD3 is a program regarding failure diagnosis.

The quick startup target program KD4 is a program that requires quick startup in control of the vehicle V.

The program SPG for management processing is a program for causing a processor to execute management processing of managing the second nonvolatile memory 320. The management processing is processing called the FTL (Flash Translation Layer) and includes processing of maintaining performance of the second nonvolatile memory 320. The management processing includes a plurality of processing items. The processing items included in the management processing are herein described.

A first processing item is LBA-PBA map.

LBP is an abbreviation of Logical Block Address. PBA is an abbreviation of Physical Block Address.

The LBA-PBA map is processing of associating logical block addresses and physical block addresses with each other.

A second processing item is ECC.

ECC is an abbreviation of Error-Correction Code.

The ECC is processing called error detection and correction.

A third processing item is Garbage Collection.

The Garbage Collection is processing for automatically releasing and making an area reusable as a free space which area becomes unnecessary out of the memory area occupied by a program that is being executed.

A fourth processing item is Refresh.

The Refresh is processing, for retaining data, of periodically reading data from a memory area and rewriting the read data in the same memory area without modification.

A fifth processing item is Power loss protection.

The Power loss protection is processing for protecting the memory against power supply shutdown, or in vehicle startup, examining whether or not the previous termination has been done thorough a normal sequence, and in the case of abnormal termination, performing integrity verification between the state of Cache programming and the first processing item at the destination of writing.

A sixth processing item is Cache programming.

The Cache programming is processing of caching data.

The second nonvolatile memory 320 is a memory constituted of NAND flash memory elements. Namely, the second nonvolatile memory 320 is a NAND flash memory. The second nonvolatile memory 320 stores non-participating data HD.

The non-participating data HD corresponds to "second data" of the present disclosure.

The non-participating data HD is data not participating with control of the vehicle V. In FIG. 2, a startup program HD1, first EDR (Event Data Recorder) data HD2, second EDR data HD3, map data HD4, and a startup program HD5 for backup are exemplified as the non-participating data HD.

The startup program HD1 is a program for starting up processing that does not participate with control of the vehicle V. For example, the startup program HD1 is a program for recording data such as the first EDR data HD2 and the second EDR data HD3 in the second nonvolatile memory 320.

The first EDR data HD2 is data regarding the vehicle V. The first EDR data HD2 is data indicating targets that more frequently undergo rewriting events than the second EDR data HD3, being data indicating an average speed of the vehicle V, a mileage of the vehicle V, and the like, for example.

The second EDR data HD3 is data regarding the vehicle V. The second EDR data HD3 is data indicating targets that less frequently undergo rewriting events than the first EDR data HD2, being data indicating whether the brake was used or unused, the impact on the vehicle V, and the like, in the event of an accident, for example.

The map data HD4 is data for presenting a map.

The startup program HD5 for backup is a program for backing up the startup program HD1.

Each non-participating data HD has a different rewriting frequency of data depending on the type of data. Notably, the rewriting frequency is the number of times where rewriting is performed in a predetermined period. Moreover, each non-participating data HD has a different period of being retained in the storage area (hereafter called a "retention period") depending on the type of data. Therefore, in the present embodiment, the non-participating data HD are stored in different storage areas based on the rewriting frequency and the retention period.

Figure 3:
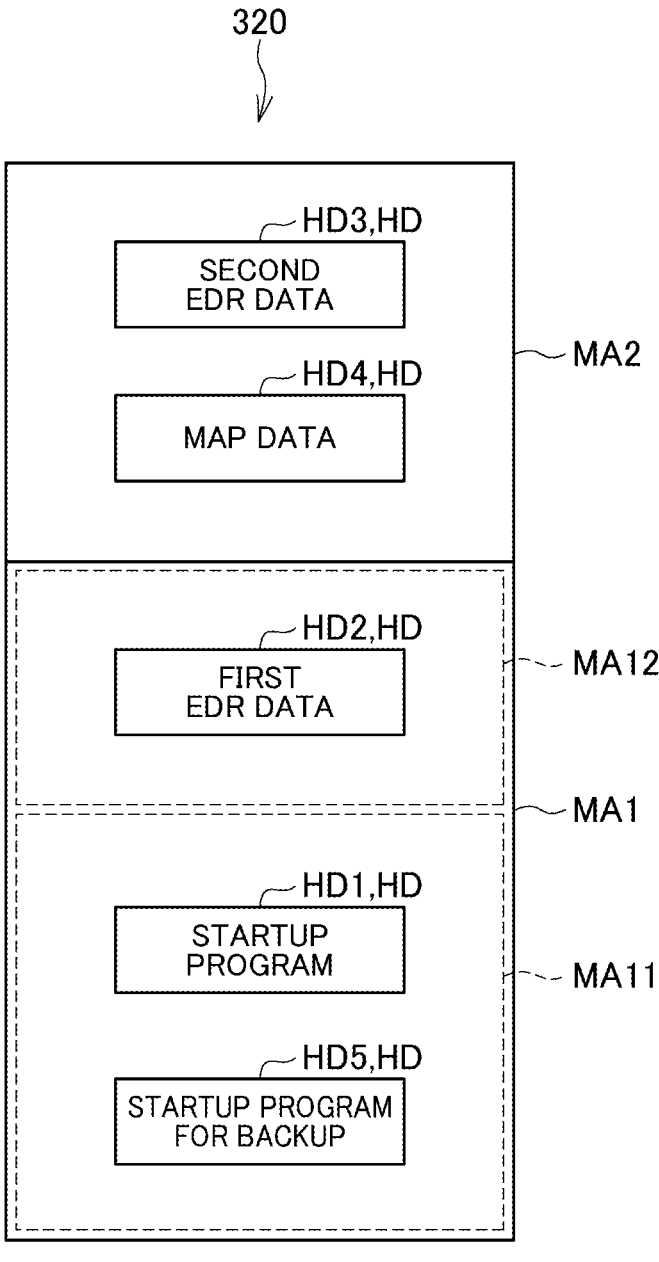
FIG. 3 is a diagram schematically showing a storage area of a second nonvolatile memory.

FIG. 3 is a diagram schematically showing a storage area of the second nonvolatile memory 320.

The storage area of the second nonvolatile memory 320 has a single layer cell area MA1 and a multilayer cell area MA2. The single layer cell area MA1 is an area constituted of memory cells in an SLC (Single Level Cell) manner, and accumulates one-bit data in one memory cell. The multilayer cell area MA2 is an area constituted of memory cells in an MLC (Multi Level Cell) manner, and accumulates multiple-bit data in one memory cell. Notably, one recording cell constituting the multilayer cell area MA2 may be a cell accumulating 2-bit data, a cell accumulating 3-bit data, a cell accumulating 4-bit data or a cell accumulating 5-bit data.

The single layer cell area MA1 stores the non-participating data HD that has a rewriting frequency not less than a predetermined frequency. Moreover, the single layer cell area MA1 stores the non-participating data HD that has a retention period not less than a predetermined period.

Meanwhile, the multilayer cell area MA2 stores the non-participating data HD that has a rewriting frequency less than the predetermined frequency. Moreover, the multilayer cell area MA2 stores the non-participating data HD that has a retention period less than the predetermined period.

The single layer cell area MA1 includes a first area MA11 and a second area MA12. The first area MA11 stores the non-participating data HD that has a higher rewriting frequency than the non-participating data HD that is stored in the second area MA12. The first area MA11 is an area that stores, out of the non-participating data HD stored in the single layer cell area MA1, the non-participating data HD that has a rewriting frequency not less than a predetermined frequency. The second area MA12 stores the non-participating data HD that has a longer retention period than the non-participating data HD that is stored in the first area MA11. The second area MA12 is an area that stores, out of the non-participating data HD stored in the single layer cell area MA1, the non-participating data HD that has a retention period not less than a predetermined period.

FIG. 3 shows which storage area of the second nonvolatile memory 320 stores each of the non-participating data HD shown in FIG. 2. In the present embodiment, it is supposed that the rewriting frequency of the startup program HD1 is 100 and the retention period of the startup program HD1 is 15 years. Moreover, in the present embodiment, it is supposed that the rewriting frequency of the first EDR data HD2 is 100000 and the retention period of the first EDR data HD2 is two years. Moreover, in the present embodiment, it is supposed that the rewriting frequency of the second EDR data HD3 is 3000 and the retention period of the second EDR data HD3 is six months. Moreover, in the present embodiment, it is supposed that the rewriting frequency of the map data HD4 is 1000 and the retention period of the map data HD4 is blank. Moreover, in the present embodiment, it is supposed that the rewriting frequency of the startup program HD5 for backup is 100 and the retention period of the startup program HD5 for backup is 15 years.

Supposing that the aforementioned predetermined frequency is 5000 and the aforementioned predetermined period is five years, as shown in FIG. 3, the startup program HD1, the first EDR data HD2, and the startup program HD5 for backup are stored in the single layer cell area MA1. Meanwhile, the second EDR data HD3 and the map data HD4 are stored in the multilayer cell area MA2. Moreover, the first EDR data HD2 is stored in the first area MA11, and the startup program HD1 and the startup program HD5 for backup are stored in the second area MA12.

It is generally known that the SLC memory cells have higher durability in data rewriting than the MLC memory cells and more scarcely undergo data loss. Therefore, by storing the non-participating data HD that is high in rewriting frequency and the non-participating data HD that is long in retention period in the single layer cell area MA1, the second nonvolatile memory 320 can store data while restraining reliability of the data from being impaired. Meanwhile, it is known that the MLC memory cells can attain lower costs and a larger capacity than the SLC memory cells. Therefore, the second nonvolatile memory 320 having the multilayer cell area MA2 can make costs of the second nonvolatile memory 320 lower and increase the capacity of the second nonvolatile memory 320.

Moreover, the SLC memory cells have characteristics that the larger the number of times where data rewriting is performed (hereinafter called the "number of times of rewriting performance") is, the shorter the period when data can be retained (hereinafter called a "retainable period") is. In other words, as to the characteristics of the SLC memory cells, a smaller number of times of rewriting performance does not lead to a shorter retainable period. Therefore, the single layer cell area MA1 is divided into areas respectively for storing the non-participating data HD that is high in rewriting frequency and for the non-participating data HD that is long in retention period. Thereby, the second non-volatile memory 320 can store data while more restraining reliability of the data from being impaired.

The interface circuit 330 includes communication hardware such as connecters and communication circuits and communicates with the central ECU 2.

The second processor 301 functions as a second communication controlling section 3011 and a reading controlling section 3012 by reading and executing the first control program 311 stored in the first nonvolatile memory 310.

Moreover, the second processor 301 functions as a management processing executing section 3013, an execution time detecting section 3014, and a termination detecting section 3015 by reading and executing the program SPG for management processing stored in the first nonvolatile memory 310.

The second communication controlling section 3011 communicates with the central ECU 2 via the interface circuit 330.

The reading controlling section 3012 reads the participating data KD from the first nonvolatile memory 310. When completing the reading the participating data KD from the first nonvolatile memory 310, the reading controlling section 3012 reads the non-participating data HD from the second nonvolatile memory 320 subsequently to the reading from the first nonvolatile memory 310.

The management processing executing section 3013 executes the management processing on the second nonvolatile memory 320. When the ignition power supply is turned on, the management processing executing section 3013 does not execute at least the third processing item or the fourth processing item. On the other hand, when the ignition power supply is turned off, the management processing executing section 3013 executes at least the fifth processing item.

The execution time detecting section 3014 detects an execution time of the management processing executed by the management processing executing section 3013. The execution time detecting section 3014 detects the execution time by a known technology.

The termination detecting section 3015 detects whether or not the management processing has been normally terminated in previous turning off of the ignition power supply of the vehicle V. That the management processing is normally terminated means that an error does not occur in the management processing. The termination detecting section 3015 detects whether or not the management processing has been normally terminated, based on a management processing termination result recorded in the first nonvolatile memory 310 or the second nonvolatile memory 320. The management processing termination result is a result indicating whether or not the management processing has been normally terminated, and is recorded by the management processing executing section 3013. In the case where the management processing termination result indicates normal performance, the termination detecting section 3015 detects that the management processing has been normally terminated, and if not, detects that the management processing has not been normally terminated. Notably, the management processing termination result is updated by the management processing executing section 3013 when the ignition power supply of the vehicle V is turned off.

Next, operations of the sections of the controlling system 1 are described.

Figure 4:
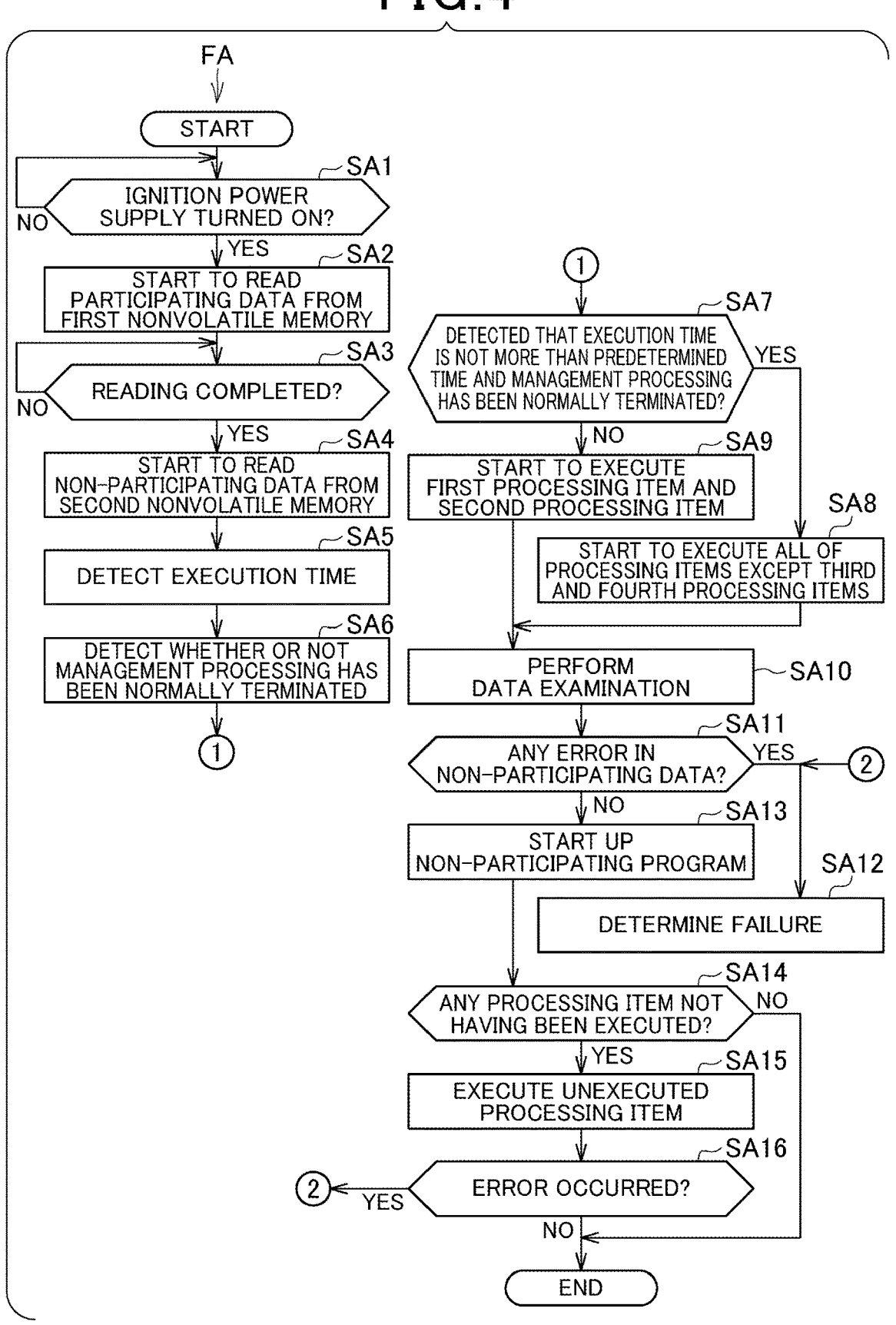
FIG. 4 is a flowchart showing an operation of an ADAS-ECU.

FIG. 4 is a flowchart FA showing operations of the ADAS-ECU 8.

The ignition power supply is in the off-state at the starting point of the operations in FIG. 4.

As shown in FIG. 4, the reading controlling section 3012 of the ADAS-ECU 8 determines whether or not the ignition power supply is turned on (step SA1). When it is determined that the ignition power supply is in the off-state (step SA1: NO), the reading controlling section 3012 reperforms the determination in step SA1.

On the other hand, when it is determined that the ignition power supply is turned on (step SA1: YES), the reading controlling section 3012 starts to read the participating data KD from the first nonvolatile memory 310 (step SA2).

The reading controlling section 3012 determines whether or not reading the participating data KD from first nonvolatile memory 310 is completed (step SA3).

When it is determined that reading the participating data KD from the first nonvolatile memory 310 is completed (step SA3: YES), the reading controlling section 3012 starts to read the non-participating data HD from the second nonvolatile memory 320 (step SA4).

Next, the execution time detecting section 3014 detects the execution time (step SA5).

Next, the termination detecting section 3015 detects whether or not the management processing has been normally terminated in previous turning off of the ignition power supply of the vehicle V (step SA6).

Next, the management processing executing section 3013 determines whether or not the execution time detected in step SA5 is not more than a predetermined time and it is detected in step SA6 that the management processing has been normally terminated (step SA7).

When it is determined that the execution time is not more than the predetermined time and it is detected that management processing has been normally terminated (step SA7: YES), the management processing executing section 3013 starts to execute all the processing items except the third and fourth processing items (step SA8).

On the other hand, when it is determined that the execution time is more than the predetermined time or that it is detected that the management processing has not been normally terminated (step SA7: NO), the management processing executing section 3013 starts to execute the first processing item and the second processing item (step SA9). Namely, when the execution time is not less than the predetermined time, the management processing executing section 3013 does not execute the third processing item, the fourth processing item, the fifth processing item or the sixth processing item, in other words, skipping execution of the third processing item, the fourth processing item, the fifth processing item, and the sixth processing item.

Next, as processing for the second processing item, the management processing executing section 3013 performs data verification on the non-participating data HD read from the second nonvolatile memory 320 (step SA10).

As processing for the second processing item, the management processing executing section 3013 determines whether or not there is an error in the non-participating data HD in the data verification performed in step SA10 (step SA11).

When it is determined that there is an error in the non-participating data HD (step SA11: YES), the management processing executing section 3013 determines that the second nonvolatile memory 320 has failure (step SA12).

On the other hand, when it is determined that there is no error in the non-participating data HD (step SA11: NO), the management processing executing section 3013 starts up, regarding the second nonvolatile memory 320 as not having failure, a non-participating program out of the non-participating data HD read from the second nonvolatile memory 320 (step SA13). Notably, the non-participating program is a program not participating with control of the vehicle V. In the example of FIG. 2 and FIG. 3, each of the startup program HD1 and the startup program HD5 for backup corresponds to the non-participating program.

Next, the management processing executing section 3013 determines whether or not there is a processing item, other than the fifth processing item, not having been executed since turning on the ignition power supply (step SA14).

When the management processing executing section 3013 determines that there is no processing item, other than the fifth processing item, not having been executed since turning on the ignition power supply (step SA14: NO), the second processor 301 terminates this process.

On the other hand, when it is determined that there is a processing item not having been executed since turning on the ignition power supply (step SA14: YES), the management processing executing section 3013 executes the unexecuted processing item (step SA15). In other words, in step SA15, the management processing executing section 3013 executes the third processing item, the fourth processing item, the fifth processing item, and the sixth processing item.

The management processing executing section 3013 determines whether or not an error occurs in the management processing having been executed since turning on the ignition power supply (step SA16). When the management processing executing section 3013 determines that an error does not occur (step SA16: NO), the second processor 301 terminates this process. When it is determined that an error occurs (step SA16: YES), the management processing executing section 3013 determines that the second nonvolatile memory 320 has failure (step SA12).

Next, operations of the sections of the controlling system 1 in the case where the ignition power supply is turned off from the on-state are described.

Figure 5:
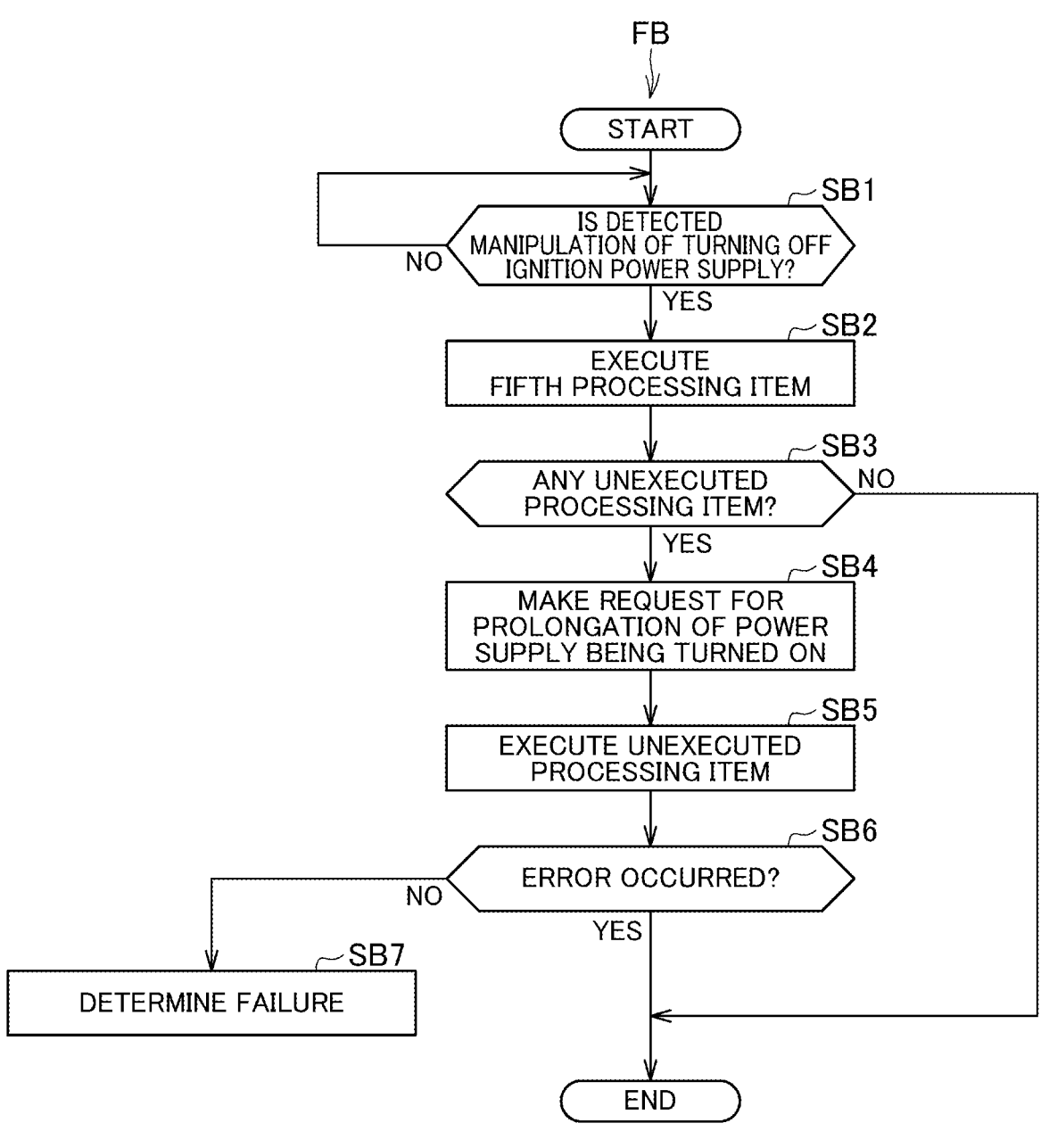
FIG. 5 is a flowchart showing the operation of the ADAS-ECU.

FIG. 5 is a flowchart FB showing operations of the ADAS-ECU 8.

The management processing executing section 3013 determines whether or not the manipulation detecting section 202 of the central ECU 2 detects a manipulation of turning off the ignition power supply (step SB1). When the manipulation detecting section 202 detects the manipulation of turning off the ignition power supply, the first communication controlling section 201 transmits, to the ADAS-ECU 8, information indicating that the manipulation detecting section 202 detects the manipulation of turning off the ignition power supply. When receiving the information, the management processing executing section 3013 makes affirmative determination in step SB1.

When it is determined that the manipulation detecting section 202 detects the manipulation of turning off the ignition power supply (step SB1: YES), the management processing executing section 3013 executes the fifth processing item (step SB2).

Next, the management processing executing section 3013 determines whether or not there is a processing item not having been executed since turning on the ignition power supply (step SB3).

When the management processing executing section 3013 determines that there is no processing item not having been executed since turning on the ignition power supply (step SB3: NO), the second processor 301 terminates this process.

On the other hand, when it is determined that there is a processing item not having been executed since turning on the ignition power supply (step SB3: YES), the management processing executing section 3013 requests the central ECU 2 for prolongation of the ignition power supply being turned on (step SB4).

Notably, when receiving the request, the power supply controlling section 203 of the central ECU 2 prolongs timing of turning off the ignition power supply. The power supply controlling section 203 may prolong the turning off the ignition power supply by a predefined prolongation period or may prolong the turning off the ignition power supply until notification, from the ADAS-ECU 8, that executing the management processing is completed. Notably, in the case of the configuration of the prolongation by the predefined period, the period is set to be a longer time than the execution time of the management processing.

Returning to the description of the flowchart FB, when making the request for prolongation in step SB4, the management processing executing section 3013 executes the unexecuted processing item (step SB5).

The management processing executing section 3013 determines whether or not an error occurs in the management processing having been executed since turning on the ignition power supply (step SB6). When the management processing executing section 3013 determines that an error does not occur (step SB6: NO), the second processor 301 terminates this process.

On the other hand, when it is determined that an error occurs (step SB6: YES), the management processing executing section 3013 determines that the second nonvolatile memory 320 has failure (step SB7).

Notably, when there is completed a condition for ending the prolongation, the power supply controlling section 203 of the central ECU 2 turns off the ignition power supply. The condition is the elapse of the predefined prolongation period, the notification, from the ADAS-ECU 8, that executing the management processing is completed, or the like.

The aforementioned embodiment is merely for presenting an aspect and any modifications and applications thereof are possible.

While the aforementioned embodiment takes a configuration that the first nonvolatile memory 310 stores the program SPG for management processing, a configuration that the second nonvolatile memory 320 stores the program SPG for management processing may be taken.

For the aforementioned embodiment, the ADAS-ECU 8 has been exemplified as the "electric device" of the present disclosure. Nevertheless, not limited to the ADAS-ECU 8, the "electric device" of the present disclosure may be another ECU such as the central ECU 2.

For the aforementioned embodiment, as the participating data KD, the second control program KD1, the communication program KD2, the diagnosis program KD3, and the quick startup target program KD4 have been exemplified. Nevertheless, not limited to these participating programs, the participating data KD may include another participating program. Moreover, not limited to participating programs, the participating data KD only has to be data participating with control of the vehicle V.

For the aforementioned embodiment, as the non-participating data HD, the startup program HD1, the first EDR data HD2, the second EDR data HD3, the map data HD4, and the startup program HD5 for backup have been exemplified. Nevertheless, not limited to these data, the non-participating data HD may include another program and another data.

For the aforementioned embodiment, as the processing items included in the management processing, the first processing item to the sixth processing item have been exemplified. Nevertheless, not limited to only the first processing item to the sixth processing item, the processing items included in the management processing may include another processing item.

The aforementioned embodiment takes a configuration that the third processing item to the sixth processing item are not executed when the execution time is not less than a predetermined time. Nevertheless, the unexecuted processing items are not limited to the third processing item to the sixth processing item, but a configuration that the fourth processing item to the sixth processing item by way of example are not executed may be taken.

The first processor 200 and the second processor 301 may be made up of a plurality of processors or of a single processor. Those processors may be hardware that is programmed so as to implement the aforementioned functional sections. In this case, those processors are made up, for example, of an ASIC (Application Specific Integrated Circuit) or an FPGA (Field Programmable Gate Array).

Moreover, the configuration of the sections of the controlling system 1 shown in FIG. 1 is merely exemplary and their specific modes of implementation are not specially limited. In other words, it is not necessary to implement hardware that individually corresponds to each section, and a configuration that the functions of the sections are implemented by one processor executing a program can, of course, be taken. Moreover, the functions implemented with software in the aforementioned embodiment may be partly implemented as hardware, or the functions implemented with hardware may be partly implemented as software.

Moreover, the operations are divided into step units shown in FIG. 4 and FIG. 5 according to their major processing matters, and the present invention is not limited by the way of division into or the names of the processing units. They may be divided into further more step units according to their processing matters. Otherwise, they may be divided such that one step unit includes further more processing elements. Moreover, the steps may be properly swapped in terms of their order unless the spirit of the present invention is not impaired.

Moreover, when the aforementioned controlling method for the controlling system 1 is implemented using a processor, programs to be executed by this processor can also be implemented in a form of a recording medium or a transmission medium for transmitting these programs. Namely, a control program 331 can also be implemented in the state where the control program 331 is recorded in a portable information recording medium. Examples of the information recording medium include a magnetic recording medium such as a hard disk drive, an optical recording medium such as a CD, and a semiconductor storage device such as a USB (Universal Serial Bus) memory or an SSD (Solid State Drive), and can also include other recording media. Moreover, as with the control program 331, the control program 211 can also be implemented in the state where the control program 211 is recorded in a portable information recording medium.

The aforementioned embodiment supports the following configurations.

(Configuration 1)

An electric device that is to be included in a vehicle, the device including: a first memory that stores first data participating with control of the vehicle; a second memory that stores second data not participating with control of the vehicle; a reading controlling section that, when a power supply for the vehicle is turned on, reads the first data, and after reading the first data, reads the second data subsequently to the reading the first data; a management processing executing section that, when the reading controlling section reads the second data, executes management processing for managing the second memory; and an execution time detecting section that detects an execution time of the management processing executed by the management processing executing section, wherein the management processing executing section does not execute, out of a plurality of processing items included in the management processing, one or part of the processing items, based on the execution time detected by the execution time detecting section.

According to the electric device of Configuration 1, since, out of the plurality of processing items included in the management processing, the one or parts of the processing items is(are) not executed based on the execution time, reading the data from the memories can be quickly completed. Moreover, since the two memories store different types of data, costs of the electric device can be reduced. Moreover, when data as a reading target is a program, the program can be quickly started up.

(Configuration 2)

The electric device according to Configuration 1, wherein the management processing executing section executes, after the reading controlling section reads the second data, the unexecuted one or parts of the processing items.

According to the electric device of Configuration 2, since the unexecuted one or parts of the processing items is(are) executed after reading the second data, data reliability as to the data stored by the second memory can be secured.

(Configuration 3)

The electric device according to Configuration 1 or 2, wherein the vehicle includes: a manipulation detecting section that detects a manipulation of turning on/off the power supply for the vehicle; and a power supply controlling section that turns on/off the power supply for the vehicle in accordance with a detection result of the manipulation detecting section, and in the case of the presence of unexecuted one or parts of the processing items when the manipulation detecting section detects the power supply being turned off, the management processing executing section requests the power supply controlling section for prolongation of the power supply being turned on and executes the unexecuted one or parts of the processing items.

According to the electric device of Configuration 3, since all the processing items can be executed before the power supply of the vehicle is turned off, reliability of the second memory can be maintained even when the power supply of the vehicle is to be turned off. Therefore, reliability of data stored by the second memory can be prevented from being impaired caused by turning off the power supply of the vehicle.

(Configuration 4)

The electric device according to any one of Configurations 1 to 3, including a termination detecting section that detects whether or not the management processing has been normally terminated in previous turning off of the power supply of the vehicle, wherein the management processing executing section executes the plurality of processing items when the termination detecting section detects that the management processing has not been normally terminated.

According to the electric device of Configuration 4, even when there is a processing item not having been normally terminated, data reliability can be secured by executing the plurality of processing items.
(Configuration 5)

The electric device according to any one of Configurations 1 to 4, wherein a storage area of the second memory includes a single layer cell area and a multilayer cell area, and the second data is stored in any of the single layer cell area and the multilayer cell area, based on a rewriting frequency or a retention period as a period of retention in the storage area.

According to the electric device of Configuration 5, by storing data dividedly in storage areas in accordance with the characteristics of the data, reliability of data stored by the second memory can be restrained from being impaired.
(Configuration 6)

The electric device according to Configuration 5, wherein the single layer cell area includes a first area and a second area, the first area stores the second data that has a higher rewriting frequency than the second data that is stored in the second area, and the second area stores the second data that has a longer retention period than the second data that is stored in the first area.

According to the electric device of Configuration 6, by storing data dividedly in areas of the single layer cell area in accordance with the characteristics of the data, reliability of data stored by the second memory can be further restrained from being impaired.
(Configuration 7)

The electric device according to any one of Configurations 1 to 6, wherein the first memory is constituted of NOR flash memory elements, and the second memory is constituted of NAND flash memory elements.

According to the electric device of Configuration 7, by setting the first memory to a NOR flash memory high in memory reliability and setting the second memory to a NAND flash memory low in costs and large in capacity, the electric device can be made low in costs and the electric device can be made large in capacity while securing reliability of data stored by the memories.
(Configuration 8)

A controlling method for an electric device that is to be included in a vehicle and includes a first memory that stores first data participating with control of the vehicle and a second memory that stores second data not participating with control of the vehicle, the method including: a step of reading, when a power supply for the vehicle is turned on, the first data; a step of reading, after reading the first data, the second data subsequently to the reading the first data; a step of executing, when reading the second data, management processing for managing the second memory; and a step of detecting an execution time of the management processing, wherein the step of executing the management processing does not execute, out of a plurality of processing items included in the management processing, one or parts of the processing items, based on the execution time detected in the step of detecting the execution time.

According to the controlling method for an electric device of Configuration 8, the similar effects to those of the electric device of Configuration 1 are attained.

REFERENCE SIGNS LIST

1 Controlling system
2 Central ECU
8 ADAS-ECU (electric device)
7 Ignition switch
200 First processor
201 First communication controlling section
202 Manipulation detecting section
203 Power supply controlling section
210 Central ECU memory
211 Control program
301 Second processor
302 Volatile memory
310 First nonvolatile memory (first memory)
311 First control program
320 Second nonvolatile memory (second memory)
330 Interface circuit
3011 Second communication controlling section
3012 Reading controlling section
3013 Management processing executing section
3014 Execution time detecting section
3015 Termination detecting section
HD Non-participating data (second data)
KD Participating data (first data)
MA1 Single layer cell area
MA11 First area
MA12 Second area
MA2 Multilayer cell area
SPG Program for management processing
V Vehicle

What is claimed is:

1. An electric device that is to be included in a vehicle, the device comprising a processor that functions as:

a first memory that stores first data participating with control of the vehicle;

a second memory that stores second data not participating with control of the vehicle;

a reading controlling section that, when a power supply for the vehicle is turned on, reads the first data, and after reading the first data, reads the second data subsequently to the reading the first data;

a management processing executing section that, when the reading controlling section reads the second data, executes management processing for managing the second memory; and an execution time detecting section that detects an execution time of the management processing executed by the management processing executing section, wherein the management processing executing section does not execute, out of a plurality of processing items included in the management processing, one or parts of the processing items, when the execution time detected by the execution time detecting section is determined to be greater than a predetermined time, and the management processing executing section executes, after the reading controlling section reads the second data, the unexecuted one or parts of the processing items, wherein the processor further functions as:

a manipulation detecting section that detects a manipulation of turning on/off the power supply for the vehicle; and a power supply controlling section that turns on/off the power supply for the vehicle in accordance with a detection result of the manipulation detecting section, and in the case that unexecuted one or parts of the processing items are present when the manipulation detecting section detects the power supply being turned off, the management processing executing section requests the power supply controlling section for prolongation of the power supply being turned on and executes the unexecuted one or parts of the processing items.

2. The electric device according to claim 1, wherein the processor further functions as a termination detecting section that detects whether or not the management processing has been normally terminated in previous turning off of the power supply of the vehicle, and the management processing executing section executes the plurality of processing items when the termination detecting section detects that the management processing has not been normally terminated.

3. The electric device according to claim 1, wherein a storage area of the second memory includes a single layer cell area and a multilayer cell area, and the second data is stored in any of the single layer cell area and the multilayer cell area, based on a rewriting frequency or a retention period as a period of retention in the storage area.

4. The electric device according to claim 3, wherein the single layer cell area includes a first area and a second area, the first area stores the second data that has a higher rewriting frequency than the second data that is stored in the second area, and the second area stored the second data that has a longer retention period than the second data that is stored in the first area.

5. The electric device according to claim 1, wherein the first memory is constituted of NOR flash memory elements, and the second memory is constituted of NAND flash memory elements.

6. A controlling method for an electric device that is to be included in a vehicle and includes a first memory that stores first data participating with control of the vehicle and a second memory that stores second data not participating with control of the vehicle, the method comprising:

a step of reading, when a power supply for the vehicle is turned on, the first data;

a step of reading, after reading the first data, the second data subsequently to the reading the first data;

a step of executing, when reading the second data, management processing for managing the second memory;

a step of detecting an execution time of the management processing, wherein the step of executing the management processing does not execute, out of a plurality of processing items included in the management processing, one or parts of the processing items when the execution time detected in the step of detecting the execution time is determined to be greater than a predetermined time, the step of executing the management processing executes, after the step of reading the second data, the unexecuted one or parts of the processing items, a step of detecting, by a manipulation detecting section, a manipulation of turning on/off the power supply for the vehicle; and a step of turning on/off, by a power supply controlling section, the power supply for the vehicle in accordance with a detection result of the manipulation detecting section, and in the case that unexecuted one or parts of the processing items are present when the manipulation detecting section detects the power supply being turned off, the management processing executing section requests the power supply controlling section for prolongation of the power supply being turned on and executes the unexecuted one or parts of the processing items.

* * * * *